United States Patent [19]

Yanagimoto et al.

[11] Patent Number: 5,496,584
[45] Date of Patent: Mar. 5, 1996

[54] METHOD FOR REMOVING A LIQUID CRYSTAL ALIGNMENT FILM

[75] Inventors: Akira Yanagimoto; Takashi Harunari; Akihiro Konno; Toshiyasu Okamura, all of Tokyo, Japan

[73] Assignee: Nissan Chemical Industries Ltd., Tokyo, Japan

[21] Appl. No.: 340,447

[22] Filed: Nov. 14, 1994

Related U.S. Application Data

[63] Continuation of Ser. No. 139,085, Oct. 20, 1993, abandoned.

[30] Foreign Application Priority Data

Oct. 22, 1992 [JP] Japan ................. 4-284624

[51] Int. Cl.⁶ ................. B05D 1/00; B08B 3/04
[52] U.S. Cl. ................. 427/154; 134/1; 134/26; 134/29; 430/294; 430/329
[58] Field of Search ................. 134/1, 26, 29, 134/42; 430/283, 294, 329; 428/1, 473.5; 427/154

[56] References Cited

U.S. PATENT DOCUMENTS

| | | | |
|---|---|---|---|
| 4,358,579 | 11/1982 | Nimry et al. | 528/188 |
| 4,877,718 | 10/1989 | Moore et al. | 430/326 |
| 4,886,734 | 12/1989 | Moore et al. | 430/270 |
| 5,053,480 | 10/1991 | Koto et al. | 528/188 |

*Primary Examiner*—Jan H. Silbaugh
*Assistant Examiner*—Saeed Chaudhry
*Attorney, Agent, or Firm*—Oblon, Spivak, McClelland, Maier & Neustadt

[57] ABSTRACT

A method for removing a liquid crystal alignment film from a liquid crystal cell substrate having the alignment film formed by coating a solution containing, as the main component, a polyamic acid having, as the main repeating units, a chemical structure of the following formula (1):

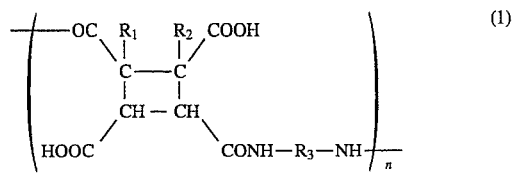

wherein each of $R_1$ and $R_2$ is a hydrogen atom or a methyl group, $R_3$ is a bivalent organic group constituting a diamine, and n is from 10 to 1,000, followed by baking, which method comprises irradiating said liquid crystal cell substrate with ultraviolet rays having wavelengths within a range of from 230 to 300 nm and then treating it with an aprotic highly polar organic solvent or an alkaline solvent.

2 Claims, 1 Drawing Sheet

METHOD FOR REMOVING A LIQUID CRYSTAL ALIGNMENT FILM

This application is a continuation of application Ser. No. 08/139,085, filed on Oct. 20, 1993, now abandoned.

The present invention relates to a method for removing a liquid crystal alignment film from a liquid crystal cell substrate and is intended to provide a method for removing only the alignment film under a condition as mild as possible without giving a damage to the substrate and thereby reclaiming an expensive electrode-formed substrate or a color filter substrate for a liquid crystal display device.

A liquid crystal cell for a twisted nematic (TN) type liquid crystal display device or a super twisted nematic (STN) type liquid crystal display device is formed by coupling two sets of substrates each having a structure as shown in FIG. 1 or 2. In the case of a color display device, one of the substrates has a structure as shown in FIG. 3. In an active matrix (AM) type liquid crystal display device for color display, a liquid crystal cell is formed by bonding a substrate having semiconductor elements as shown in FIG. 4 with substrate of FIG. 3 (in a thin film transistor (TFT) type liquid crystal display device, the transparent electrode is not patterned), as shown in FIG. 4. These substrates are all provided with an alignment film made of e.g. polyimide as the top layer.

Display failures of liquid crystal display devices may be caused by various factors. Among them, failures resulting from the process for forming an alignment film, are caused by many factors, such as coating irregularities in the alignment film, dusts having deposited on the film during the coating, drying or baking step, or local scraping, peeling or scratching of the film at the time of rubbing and constitute a substantial proportion in overall failures.

Such failures are detected by inspection of substrates or cells during the manufacture of liquid crystal cells. However, the substrates having such failures can hardly be reclaimed, and most of them are disposed. Thus, such failures not only lead to an increase of the price of the products, but also bring about a substantial loss of resources. Heretofore, as an attempt to reclaim a substrate, a method has been proposed wherein a strongly acidic or strongly alkaline reagent is used to remove not only the alignment film but also the transparent electrode or the alkali-sealing film. However, by such a method, a damage to the substrate was substantial, and it was difficult to apply such a method to a color filter substrate or to a substrate for an AM type liquid crystal display device. To reclaim a valuable substrate, it is most desired to remove the alignment film only. However, once baked, the alignment film would be excellent in chemical resistance, and it used to be difficult to simply remove it.

It is known that a polyimide formed from cyclobutane-tetracarboxylic dianhydride and oxydianiline, undergoes breakage of molecules when irradiated with ultraviolet rays and thus can be dissolved and developed with an aprotic polar solvent such as dimethylacetamide (DMAC) or dimethylformamide (DMF) (U.S. Pat. No. 4,877,718). However, a film baked at 250° C. and thus imide-modified, has no adequate solubility, and its developable property will be saturated at a dose of up to 500 mj/cm², whereby the film can be removed only at a level of 20% by one operation.

The present inventors have found that when an alignment film of a baked specific polyimide is irradiated with ultraviolet rays within a specific wavelength range, followed by treatment with an organic solvent or with an aqueous alkaline solution, it is possible to readily peel and remove only the alignment film without giving any damage to the substrate, and thereby to reclaim a liquid crystal cell substrate such as an expensive electrode-formed substrate or a color filter substrate of a liquid crystal display device. The present invention has been accomplished on the basis of this discovery.

Namely, it is an object of the present invention to provide a method for reclaiming a liquid crystal cell substrate by removing only the alignment film from the substrate without giving any damage to the substrate.

Thus, the present invention provides a method for removing a liquid crystal alignment film from a liquid crystal cell substrate having the alignment film formed by coating a solution containing, as the main component, a polyamic acid having, as the main repeating units, a chemical structure of the following formula (1):

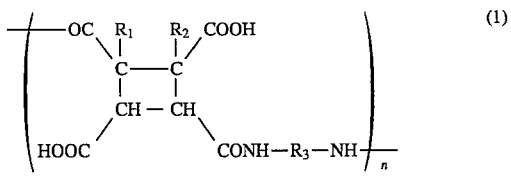

wherein each of $R_1$ and $R_2$ is a hydrogen atom or a methyl group, $R_3$ is a bivalent organic group constituting a diamine, and n is from 10 to 1,000, followed by baking, which method comprises irradiating said liquid crystal cell substrate with ultraviolet rays having wavelengths within a range of from 230 to 300 nm and then treating it with an aprotic highly polar organic solvent or an alkaline solvent.

Figure 4:
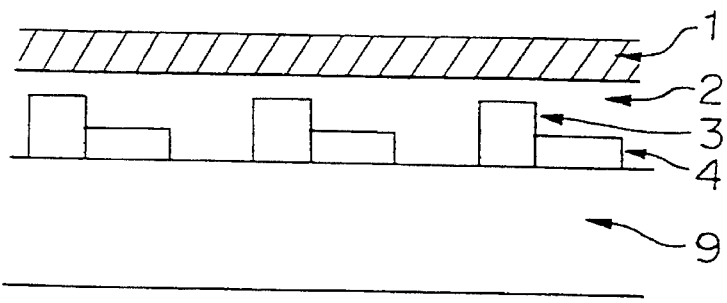

FIG. 4 is a diagrammatical view illustrating the cross section of a substrate having an alignment film provided on an AM type device substrate. In the FIGS. 1–4, reference numbers 1–9 represent the following: 1) liquid crystal alignment film; 2) electrode protecting film; 3) semiconductor device; 4) transparent electrode; 5) alkali-sealing film; 6) overcoat film; 7) color filter layer; 8) alkali glass; and 9) non-alkali glass.

When baked at a temperature of at least 140° C., the polyamic acid of the formula (1) undergoes dehydration ring-closure and is converted to have a structure of the formula (2):

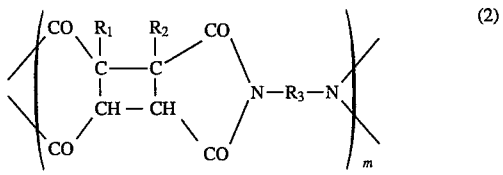

wherein $R_1$, $R_2$, $R_3$ and m are as defined with respect to the formula (1). Even when the conversion is as low as about 10%, the solubility of the formed coating film in an organic solvent decreases substantially, and the chemical resistance increases. When the conversion becomes at least 50 or 60%, the film tends to be insoluble in most organic solvents and the chemical resistance will be substantially improved. Accordingly, as the degree of ring-closure proceeds, it tends to be more difficult to remove the alignment film from the substrate. When the conversion to the imide ring is at least 80%, the alignment film will not be peeled unless the polyimide is hydrolyzed by treatment with a strongly basic reagent for a long period of time. However, in such hydrolysis treatment, damages to the glass or other constituting parts of the liquid crystal cell substrate will increase and create a problem from the viewpoint of reclamation.

A method for producing the polyamic acid of the formula (1) to be used in the present invention, is disclosed in U.S. Pat. No. 5,053,480. Namely, it can be obtained by addition polymerization of cyclobutane-1,2:3,4-tetracarboxylic dianhydride or its methylsubstituted product of the formula (3) with a diamine of the formula (4) as the main monomer:

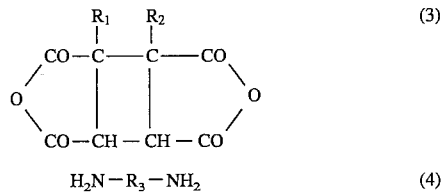

$$H_2N-R_3-NH_2 \quad (4)$$

wherein $R_1$, $R_2$ and $R_3$ are as defined with respect to the formula (1).

Specific examples of the diamine of the formula (4) include aromatic diamines such as p-phenylenediamine, m-phenylenediamine, diaminodiphenylmethane, 2,2'-diaminodiphenylpropane, diaminodiphenylsulfone, diaminobenzophenone, diaminonaphthalene, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl] propane and 1,1,1,3,3,3-hexafluoro-2,2-bis[4-(4-aminophenoxy)phenyl] propane. Among these diamines, preferred are diaminodiphenylmethane, 2,2'-diaminodiphenylpropane, diaminodiphenylsulfone, 2,2-bis[4-(4-aminophenoxy)phenyl] propane and 1,1,1,3,3,3-hexafluoro-2,2-bis[4-(4-aminophenoxy)phenyl] propane.

Further, such aromatic rings may have substituents such as alkyl groups, alkoxy groups or halogen atoms.

Depending upon the particular purpose, the following diaminosiloxanes may also be employed.

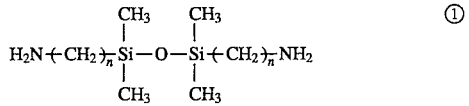

wherein n is from 1 to 6.

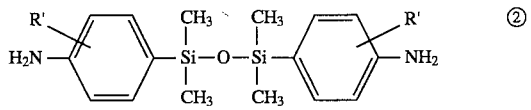

wherein R' is H or a $C_{1-3}$ alkyl group.

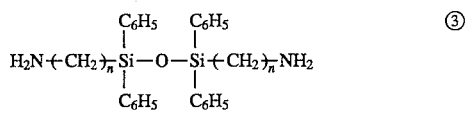

wherein n is from 1 to 6.

These diamines may be used alone or in combination as a mixture of two or more. The aromatic diamine is used usually in an amount of at least 70 mol %, preferably at least 80 mol %, of the total amount of diamine component monomers of the formula (4).

As the acid anhydride, cyclobutane-1,2,3,4-tetracarboxylic dianhydride or its methyl derivative of the formula (3) is used as the main component. As the tetracarboxylic dianhydride of the formula (3), cyclobutane-1,2,3,4,-tetracarboxylic dianhydride where $R_1$ and $R_2$ are hydrogen, is preferred. The proportion of the monomer of the tetracarboxylic dianhydride of the formula (3) is usually at least 70 mol %, preferably at least 80 mol %, in the acid monomer component. A small amount of a polymer chain terminal termination agent such as a monoamine compound or a dicarboxylic anhydride may likewise be used.

The polyamic acid of the formula (1) thus prepared, is dissolved in a single solvent of N,N-dimethylformamide, N,N-dimethylacetamide, N-methyl-2-pyrrolidone, dimethylsulfoxide or γ-butyrolactone, or in a solvent mixture thereof, or in a solvent mixture having a poor solvent to the polyamic acid incorporated thereto within a range where the polyamic acid can still be dissolved. Then, an agent for improving the adhesion or coating properties to the substrate such as a silane coupling agent or a defoaming agent, etc. may be added to this polyamic acid solution. The adhesion-improving agent may preliminarily be incorporated to the polyamic acid solution, or may be coated on the substrate surface prior to the coating of the polyamic acid solution.

The substrate on which the said agent for alignment treatment is to be coated, may, for example, be a glass substrate having a transparent electrode, a glass substrate having a transparent electrode and a semiconductor element, a glass substrate having a color filter, or a substrate having an inorganic or organic film applied for the purpose of protecting such a transparent electrode or a color filter. However, the substrate is not limited to such specific examples so long as it is a substrate to be used for a liquid crystal display device.

The temperature for baking the coated film after coating the agent for alignment treatment varies depending upon the heat resistance of the substrate, but is usually from 140° C. to 350° C. It is usually from 200° C. to 300° C. in the case of a substrate for a STN type liquid crystal display device for black and white display, from 180° C. to 250° C. in the case of a substrate on the semiconductor element side of an AM type liquid crystal display device and from 170° C. to 230° C. in the case of a color filter side substrate.

The alignment film thus formed can not easily be removed from the substrate merely by dipping treatment in an organic solvent or an alkaline solvent for dissolving the polyamic acid. However, after irradiated with ultraviolet rays, it can easily be dissolved or peeled and thus can be removed from the substrate. The irradiation source of ultraviolet rays may be a high pressure mercury lamp or a low pressure mercury lamp, and the effective wavelength is from 230 to 300 nm. The dose of ultraviolet rays required to obtain an adequate effect for removing the alignment film varies depending upon e.g. the type of the polyamic acid, the baking conditions and the thickness of the alignment film, the type of the treating solution and the temperature for treatment, but it is usually at least 100 mj/cm², preferably at least 500 mj/cm², at a wavelength of 254 nm. There is no particular limitation as to the upper limit of this dose, but the dose is usually at most 20 j/cm².

An aprotic highly polar organic solvent is preferred as the organic solvent to dissolve and remove the alignment film irradiated with ultraviolet rays. Specific examples of such a solvent include N-methyl-2-pyrrolidone, N,N-dimethylformamide, N,N-dimethylacetamide, dimethylsulfoxide, 1,3-dimethyl-2-imidazolidinone, γ-butyrolactone, diacetone alcohol, ethylene glycol monomethyl ether, ethylene glycol monoethyl ether, diethylene glycol monomethyl ether, diethylene glycol monoethyl ether, ethylene glycol monomethyl ether acetate and propylene carbonate. Particularly preferred organic solvents are N-methyl-2-pyrrolidone, N,N-dimethylformamide, N,N-dimethylacetamide, γ-butyrolactone, diacetone alcohol and ethylene glycol monomethyl ether.

However, the solvent is not limited to such specific examples, so long as it is an aprotic highly polar solvent.

These solvents may be used alone or in combination as a mixture of two or more. Otherwise, a solvent mixture comprising 70% by weight in total of these solvents and other solvents, may be used.

The alkaline solvent may, for example, be an aqueous solution of an alkali metal hydroxide such as sodium hydroxide or potassium hydroxide, an alkaline earth metal hydroxide such as calcium hydroxide, ammonia or an organic ammonium compound such as tetramethyl ammonium hydroxide, or an alkaline cleaning solution. Such an alkaline solvent has a function of peeling and dissolving for removal the alignment film from the substrate by a reaction of e.g. hydrolyzing imide bonds of the polyimide having the molecular weight lowered upon being irradiated with ultraviolet rays to form a carboxylate. The alkaline solvent is used preferably within a pH range of from 10 to 13.5. Such alkaline solvents may be used alone or in combination as a mixture of two or more. If necessary, an alcohol or the above-mentioned organic solvent may be added thereto.

The alkaline solvent may be applicable to an alignment film having baked at a temperature within a range of from 140° to 350° C. However, in the case of the aprotic highly polar organic solvent, the baking temperature of the alignment film is preferably within a range of from 140° to 240° C., as compared with the case of the alkaline solvent.

The substrate having only the alignment film thus removed, can be reclaimed by washing with water, followed by drying and coating a fresh alignment film thereon.

Now, the present invention will be described in further detail with reference to Examples and Comparative Examples.

EXAMPLE 1

Figure 1:
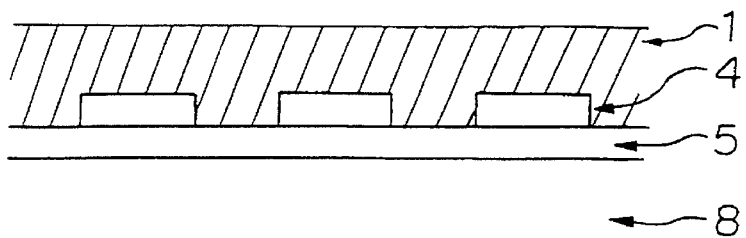
FIG. 1 illustrates a TN or STN type liquid crystal cell substrate having no electrode-protecting film.
Figure 2:
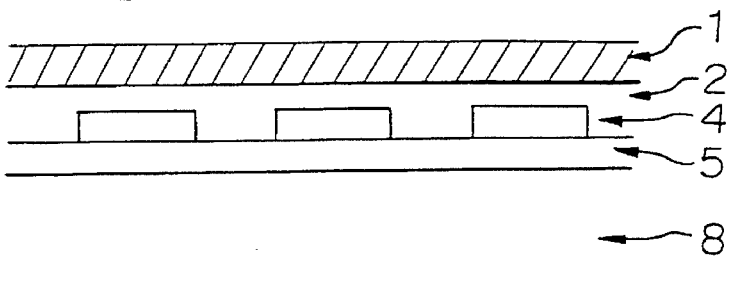
FIG. 2 illustrates a TN or STN type liquid crystal cell substrate having an electrode-protecting film.
Figure 3:
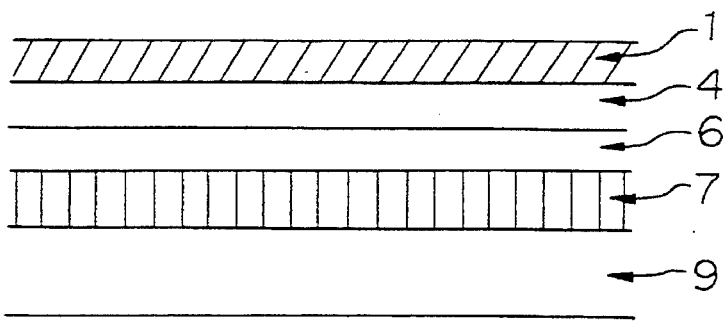
FIG. 3 illustrates a color filter substrate.

Cyclobutane-1,2:3,4-tetracarboxylic dianhydride and 1,1,1,3,3,3-hexafluoro-2,2-bis[4-(4-aminophenoxy)phenyl] propane were subjected to an addition reaction at a molar ratio of 1:1 at room temperature for 8 hours to obtain a polyamic acid. An N-methyl-2-pyrrolidone solution containing 3% by weight of the obtained polyamic acid and 0.1% by weight of 7-(2-aminoethyl)aminopropyltrimethoxysilane as a silane coupling agent, was coated on a soda-lime glass substrate having an alkali-sealing film and having a transparent electrode and an electrode-protecting film thereon, followed by baking at 230° C. for one hour to form an alignment film having a thickness of 920 Å and thus to obtain a liquid crystal cell substrate having a structure as shown in FIG. 1. This substrate was irradiated for 25 seconds by a high pressure ultraviolet ray irradiation apparatus (mercury lamp type: H03-L31W) manufactured by Aigraphic K.K. The dose of irradiated was 2000 mj/cm$^2$ at 365 nm and 1140 mj/cm$^2$ at 254 nm. The substrate was immersed in N-methyl-2-pyrrolidone at room temperature for 10 minutes while applying ultrasonic waves thereto, followed by washing with water for 2 minutes. After drying, the substrate was inspected by a microscope, whereby it was found that the alignment film was completely removed without any residual film, and the electrode-protecting film and the transparent electrode as underlayers were not damaged at all.

EXAMPLE 2

A liquid crystal cell substrate was treated under the same conditions as in Example 1 except that the baking of the alignment film was conducted at 260° C. for one hour, and the dose of the high pressure ultraviolet rays was changed to twice as much. Such a substrate was immersed in a solution of pH 13.2 obtained by diluting an alkaline cleaning agent (Homezaline F-236L-1, tradename, manufactured by Kao Corporation) with 20 times of pure water at room temperature while applying supersonic waves, followed by washing with water for 2 minutes. After drying, the substrate was inspected by a microscope, whereby it was found that the alignment film was completely removed without any residual film, and the electrode-protecting film, the transparent electrode and the alkali-sealing film as underlayers were not damaged at all.

EXAMPLE 3

The liquid crystal cell substrate of Example 1 was irradiated for 2 minutes by a PL1-907 Model low pressure ultraviolet ray irradiation apparatus (mercury lamp type: SUV-90US) manufactured by Sen Engineering, while being covered by a filter capable of absorbing lights with wavelengths of 300 nm or more. The dose was 1200 mj/cm$^2$ at a wavelength of 254 nm.

This substrate was immersed in N,N-dimethylformamide at room temperature for 10 minutes while applying supersonic waves, followed by washing with water for 2 minutes. After drying, the substrate was inspected by a microscope, whereby it was found that the alignment film was completely removed without any residual film, and the substrate constituting materials of the underlayers were not damaged at all.

EXAMPLE 4

Cyclobutane-1,2:3,4-tetracarboxylic dianhydride, 2,2-bis[4-(4-aminophenoxy)phenyl] propane and 1,3-bis(3-aminopropyl)tetramethyldisiloxane were subjected to an addition reaction at a molar ratio of 1:0.9:0.1 at room temperature for 10 hours to obtain a polyamic acid. An N-methyl-2-pyrrolidone solution containing 4% by weight of the polyamic acid, was coated on a color filter substrate having a base of an acrylate resin covered with a transparent electrode, followed by baking at 200° C. for one hour to form an alignment film having a thickness of 1,050 Å. This substrate was irradiated for 30 minutes by a high pressure ultraviolet ray irradiation apparatus, Light-Welder PC-2 manufactured by Dymax Co., U.S.A. The dose was 12 j/cm$^2$ at a wavelength of from 320 to 390 nm and 1,800 mj/cm$^2$ at a wavelength of 254 nm. This substrate was immersed in N-methyl-2-pyrrolidone at room temperature for 10 minutes while applying supersonic waves, followed by washing with water for 2 minutes. After drying, the substrate was inspected by a microscope, whereby it was found that the alignment film was completely removed, and the transparent electrode and the color filter layer as underlayers were not damaged at all.

EXAMPLE 5

The treatment was carried out in the same manner as in Example 4 except that N-methyl-2-pyrrolidone was changed to an alkaline cleaning agent of pH 11.5 (Look Range Cleaning Agent, tradename, manufactured by Lion Corporation). After drying, the substrate was inspected by a microscope, whereby it was found that the alignment film was completely removed, and the transparent electrode and the color filter layer as underlayers were not damaged at all.

EXAMPLE 6

The treatment was carried out in the same manner as in Example 4 except that N-methyl-2-pyrrolidone was changed to diethylene glycol monoethyl ether. After drying, the substrate was inspected by a microscope, whereby it was found that the alignment film was completely removed, and the transparent electrode and the color filter layer as underlayers were not damaged at all.

COMPARATIVE EXAMPLE 1

Without being irradiated with ultraviolet rays, a liquid crystal cell substrate having an alignment film formed in the same manner as in Example 1, was immersed in N-methyl-2-pyrrolidone at room temperature and then treated for 10 minutes while applying supersonic waves, followed by washing with water for 2 minutes. After drying, the substrate was inspected by a microscope, whereby it was found that the alignment film was not removed from the substrate. Then, the substrate was again immersed in N-methyl-2-pyrrolidone for 50 minutes for the same treatment, but the alignment film was still not removed.

COMPARATIVE EXAMPLE 2

A liquid crystal cell substrate was irradiated with ultraviolet rays in the same manner as in Example 2 except that an ultraviolet ray filter for cutting lights with wavelengths of 300 nm or less, was used. The dose was 2,900 mj/cm$^2$ at a wavelength of 365 nm and 70 mj/cm$^2$ as measured at a wavelength of 254 nm.

This substrate was treated for 10 minutes with an aqueous solution having an alkaline cleaning agent (Homezaline F-236L-1, tradename, manufactured by Kao Corporation) diluted 20 times, in the same manner as in Example 2, but the alignment film was not removed. The treatment was further continued for 50 minutes, whereby a part of the alignment film was peeled, but the major portion thereof still remained, and the removal was incomplete.

COMPARATIVE EXAMPLE 3

A liquid crystal cell substrate irradiated with ultraviolet rays in the same manner as in Example 1, was immersed in an ethanol solution of pH 13.8 having 5% by weight of potassium hydroxide dissolved, and treated for 10 minutes while applying supersonic waves. The substrate was washed with water and dried. The surface condition of the dried substrate was inspected, whereby the alignment film was found to have been peeled, but numerous cracks were observed in the transparent electrode-protecting film as the underlayer.

We claim:

1. A method for the complete removal of a polyimide alignment film from a liquid crystal cell substrate in a liquid crystal cell in one treatment, said treatment comprising the steps of a) irradiating said alignment film with ultraviolet rays having wavelengths within the range of 230–300 nm, and b) treating said liquid crystal cell with an alkaline solvent, wherein said polyimide alignment film is formed by coating a liquid crystal cell substrate with a solution comprising a polyamic acid having, as the main repeating units, a chemical structure of the following formula:

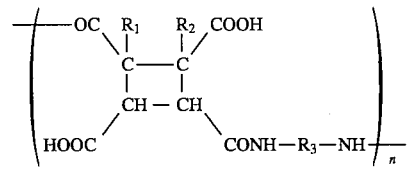

wherein each of $R_1$ and $R_2$ is hydrogen or methyl, $R_3$ is a bivalent organic group constituting a diamine, and n is from 10–1,000 followed by baking at a temperature in the range of from 140° C. to 350° C.

2. The method of claim 1, wherein the alkaline solvent is an aqueous solution of a hydroxide of an alkali metal or an alkaline earth metal, an aqueous solution of ammonia or an organic ammonium compound, or an aqueous solution of an alkaline surfactant.

* * * * *